United States Patent
Li (10) Patent No.: US 12,075,358 B2
(45) Date of Patent: Aug. 27, 2024

(54) TERMINAL DEVICE SLEEP STATE CONTROL METHOD AND APPARATUS, AND COMPUTER-READABLE STORAGE MEDIUM

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 408 days.

(21) Appl. No.: 17/594,313

(22) PCT Filed: Apr. 17, 2019

(86) PCT No.: PCT/CN2019/083107
§ 371 (c)(1),
(2) Date: Oct. 11, 2021

(87) PCT Pub. No.: WO2020/211022
PCT Pub. Date: Oct. 22, 2020

(65) Prior Publication Data
US 2022/0150833 A1 May 12, 2022

(51) Int. Cl.
*H04W 52/02* (2009.01)
(52) U.S. Cl.
CPC ... *H04W 52/0232* (2013.01); *H04W 52/0235* (2013.01); *H04W 52/0274* (2013.01)
(58) Field of Classification Search
CPC ......... H04W 52/0232; H04W 52/0235; H04W 52/0274

USPC ......................................................... 370/318
See application file for complete search history.

(56) References Cited

U.S. PATENT DOCUMENTS

| | | | |
|---|---|---|---|
| 2002/0175806 A1* | 11/2002 | Marneweck | G06K 7/0008 340/10.2 |
| 2004/0114737 A1* | 6/2004 | MacConnell | H04L 12/12 379/106.03 |
| 2005/0246137 A1* | 11/2005 | Brinkman | G01V 1/24 702/188 |
| 2006/0163349 A1* | 7/2006 | Neugebauer | G06Q 20/387 235/383 |
| 2009/0224890 A1* | 9/2009 | Kim | G06K 19/0705 340/10.33 |
| 2009/0295546 A1* | 12/2009 | Ha | H04B 10/1149 340/10.33 |

(Continued)

FOREIGN PATENT DOCUMENTS

| CN | 107155212 A | 9/2017 |
|---|---|---|
| CN | 109155970 A | 1/2019 |

(Continued)

OTHER PUBLICATIONS

International Search Report (ISR) in Application No. PCT/CN2019/083107 mailed on Jan. 15, 2020.

(Continued)

*Primary Examiner* — Mark G. Pannell
(74) *Attorney, Agent, or Firm* — Syncoda LLC; Feng Ma (57) ABSTRACT

A terminal device sleep state control method includes: monitoring a wake up signal; and determining, on the basis of a monitoring result of the wake up signal, whether to enter a sleep state from an activated state.

16 Claims, 5 Drawing Sheets

(56) References Cited

U.S. PATENT DOCUMENTS

| | | | | |
|---|---|---|---|---|
| 2011/0116429 A1* | 5/2011 | Jeon | ................ | H04W 52/0216 |
| | | | | 370/311 |
| 2014/0043498 A1* | 2/2014 | Lee | ................ | H04N 23/61 |
| | | | | 348/222.1 |
| 2014/0121727 A1* | 5/2014 | Wang | ................ | A61N 1/37223 |
| | | | | 607/60 |
| 2014/0125316 A1* | 5/2014 | Ramirez | ................ | G01D 4/00 |
| | | | | 324/110 |
| 2015/0292319 A1* | 10/2015 | Disko | ................ | E21B 47/16 |
| | | | | 367/82 |
| 2016/0142974 A1* | 5/2016 | Lindoff | ................ | H04W 56/00 |
| | | | | 370/311 |
| 2016/0366817 A1* | 12/2016 | Albinger | ................ | A01D 34/64 |
| 2017/0048918 A1* | 2/2017 | Iwamura | ................ | H04W 76/27 |
| 2018/0176864 A1 | 6/2018 | Vasishtha et al. | | |
| 2019/0053162 A1* | 2/2019 | Islam | ................ | H04W 52/0229 |
| 2020/0064420 A1* | 2/2020 | Kalnischkies | ................ | G01R 33/543 |
| 2020/0084717 A1* | 3/2020 | Höglund | ................ | H04W 68/02 |
| 2021/0306952 A1* | 9/2021 | Kuang | ................ | H04L 69/28 |
| 2022/0015034 A1* | 1/2022 | Miao | ................ | H04W 52/0235 |

FOREIGN PATENT DOCUMENTS

| | | |
|---|---|---|
| CN | 109219116 A | 1/2019 |
| CN | 109314869 A | 2/2019 |
| WO | 2019001845 A1 | 1/2019 |
| WO | 2019028825 A1 | 2/2019 |

OTHER PUBLICATIONS

1st Office Action (CNOA1) in CN 201980000716.2 mailed on Aug. 2, 2021.

* cited by examiner

FIG. 10

TERMINAL DEVICE SLEEP STATE CONTROL METHOD AND APPARATUS, AND COMPUTER-READABLE STORAGE MEDIUM

CROSS-REFERENCE TO RELATED APPLICATION

The present application is a national stage of International Application No. PCT/CN2019/083107 filed on Apr. 17, 2019, the disclosure of which is hereby incorporated by reference in its entirety.

TECHNICAL FIELD

The present disclosure relates to the field of communication technologies, and in particular to a method and an apparatus for controlling a sleep state of a terminal, and a computer-readable storage medium.

BACKGROUND

Discontinuous Reception (DRX) technology allows the terminal to stop monitoring the Physical Downlink Control Channel (PDCCH) for a certain period of time, thereby saving power.

In the DRX mechanism, the terminal in the activated state will continue to monitor the PDCCH, until the timer corresponding to the activated state expires. That is, after sending of the data at the network side is completed, the terminal may continue to monitor the PDCCH and cannot enter the sleep state in time.

In order to make the terminal enter the sleep state as quickly as possible, when it is detected that there is no downlink data transmission at the network side, a go-to-sleep indication signal will be sent to the terminal. When the terminal receives the go-to-sleep signal, it will immediately enter the sleep state. Sending the go-to-sleep signal by the network side will increase the signaling overhead at the network side.

SUMMARY

The embodiments of the present disclosure provide a method and an apparatus for controlling a sleep state of a terminal, and a computer-readable storage medium, which can control the terminal to enter the sleep state from the activated state in time without occupying network signaling overhead. The technical solution is as follows.

According to a first aspect of the embodiments of the present disclosure, there is provided a method for controlling a sleep state of a terminal, the method including:

monitoring a wake-up signal; and entering a sleep state from an activated state based on a monitoring result of the wake-up signal.

In a possible implementation, entering a sleep state from an activated state based on a monitoring result of the wake-up signal includes: determining reference information based on the monitoring result of the wake-up signal; entering the sleep state from the activated state based on the reference information.

Optionally, the reference information includes at least one of: the number of times of continuous failure to monitor the wake-up signal, or a duration of continuous failure to monitor the wake-up signal.

In some embodiments, entering the sleep state from the activated state based on the reference information includes: entering the sleep state from the activated state in response to that the reference information satisfies a trigger condition.

Optionally, the trigger condition includes at least one of: the number of times of continuous failure to monitor the wake-up signal reaching a threshold of the number of times, the number of times of continuous failure to monitor the wake-up signal within a set time reaching the threshold of the number of times, or the duration of continuous failure to monitor the wake-up signal reaching a threshold of a duration.

Optionally, entering the sleep state from the activated state based on the reference information includes:

entering the sleep state from the activated state in response to that the number of times of continuous failure to monitor the wake-up signal reaches a threshold of the number of times;

or, entering the sleep state from the activated state in response to that the number of times of continuous failure to monitor the wake-up signal within a set time reaches a threshold of the number of times;

or, entering the sleep state from the activated state in response to that the duration of continuous failure to monitor the wake-up signal reaches a threshold of a duration.

Optionally, entering the sleep state from the activated state in response to that the number of times of continuous failure to monitor the wake-up signal reaches a threshold of the number of times includes:

entering a first sleep state or a second sleep state from the activated state based on a Discontinuous Reception (DRX) cycle configured by the terminal, in response to that the number of times of continuous failure to monitor the wake-up signal reaches a first threshold of the number of times;

or, entering the second sleep state from the activated state, in response to that the number of times of continuous failure to monitor the wake-up signal reaches a second threshold of the number of times, wherein, the first sleep state is a sleep state of a short DRX cycle, and the second sleep state is a sleep state of a long DRX cycle.

Optionally, entering the sleep state from the activated state in response to that the number of times of continuous failure to monitor the wake-up signal within a set time reaches a threshold of the number of times includes:

entering a first sleep state or a second sleep state from the activated state based on a DRX cycle configured by the terminal, in response to that the number of times of continuous failure to monitor the wake-up signal within a set time reaches a first threshold of the number of times;

or, entering the second sleep state from the activated state, in response to that the number of times of continuous failure to monitor the wake-up signal within a set time reaches a second threshold of the number of times, wherein, the first sleep state is a sleep state of a short DRX cycle, and the second sleep state is a sleep state of a long DRX cycle.

Optionally, entering the sleep state from the activated state in response to that the duration of continuous failure to monitor the wake-up signal reaches a threshold of a duration includes:

entering a first sleep state or a second sleep state from the activated state based on a DRX cycle configured by the terminal, in response to that the duration of continuous failure to monitor the wake-up signal reaches a first threshold of a duration;

or, entering the second sleep state from the activated state, in response to that the duration of continuous failure to monitor the wake-up signal reaches a second threshold of a duration, wherein, the first sleep state is a sleep state of a short DRX cycle, and the second sleep state is a sleep state of a long DRX cycle.

Optionally, entering the sleep state from the activated state in response to that the number of times of continuous failure to monitor the wake-up signal reaches a threshold of the number of times and the duration of continuous failure to monitor the wake-up signal reaches a threshold of a duration includes:

if the duration of continuous failure to monitor the wake-up signal reaches the first threshold of the duration, and the number of times of continuous failure to monitor the wake-up signal reaches a first threshold of the number of times, entering the first sleep state or the second sleep state from the activated state based on the DRX cycle configured by the terminal;

or, if the duration of continuous failure to monitor the wake-up signal reaches the second threshold of the duration, and the number of times of continuous failure to monitor the wake-up signal reaches a second threshold of the number of times, entering the second sleep state from the activated state, wherein, the first threshold of the number of times is smaller than or equal to the second threshold of the number of times, the first sleep state is a sleep state of a short DRX cycle, and the second sleep state is a sleep state of a long DRX cycle.

For example, the first threshold of the number of times is smaller than or equal to the second threshold of the number of times, the first threshold of the duration is smaller than or equal to the second threshold of the duration.

Optionally, entering a first sleep state or a second sleep state from the activated state based on a DRX cycle configured by the terminal includes:

when the terminal is configured with a short DRX cycle, stopping a running timer in an On Duration Timer and Inactivity Timer, entering the first sleep state and starting a short cycle timer, and entering a long DRX cycle after the short cycle timer expires; or, when the terminal is not configured with a short DRX cycle, stopping the running timer in the On Duration Timer and Inactivity Timer, and entering the second sleep state.

Optionally, the method further includes:

determining a bandwidth part (BWP) currently used by the terminal;

determining at least one of the threshold of the number of times or the threshold of the duration based on the currently used BWP.

Optionally, the terminal at least has two BWPs with different bandwidths, and the thresholds of the duration corresponding to the two BWPs with different bandwidths are the same or different, or, the thresholds of the number of times corresponding to the two BWPs with different bandwidths are the same or different.

Optionally, the method further includes:

receiving instruction information sent by an access network device, wherein the instruction information is used to instruct the terminal to enter a sleep state from the activated state based on the monitoring result of the wake-up signal.

According to a second aspect of the embodiments of the present disclosure, there is provided an apparatus for controlling a sleep state of a terminal, including:

a monitoring module, configured to monitor a wake-up signal; and a sleep control module, configured to enter a sleep state from an activated state based on a monitoring result of the wake-up signal.

In a possible implementation, the sleep control module includes:

an information determining sub-module, configured to determine reference information based on the monitoring result of the wake-up signal;

a state determining sub-module, configured to enter the sleep state from the activated state based on the reference information.

Optionally, the reference information includes at least one of: the number of times of continuous failure to monitor the wake-up signal, or a duration of continuous failure to monitor the wake-up signal.

Optionally, the state determining sub-module is configured to enter the sleep state from the activated state in response to that the reference information satisfies a trigger condition.

Optionally, the trigger condition includes at least one of: the number of times of continuous failure to monitor the wake-up signal reaching a threshold of the number of times, the number of times of continuous failure to monitor the wake-up signal within a set time reaching the threshold of the number of times, or the duration of continuous failure to monitor the wake-up signal reaching a threshold of a duration.

Optionally, the state determining sub-module is configured to enter the sleep state from the activated state in response to that the number of times of continuous failure to monitor the wake-up signal reaches a threshold of the number of times;

or, the state determining sub-module is configured to enter the sleep state from the activated state in response to that the number of times of continuous failure to monitor the wake-up signal within a set time reaches a threshold of the number of times;

or, the state determining sub-module is configured to enter the sleep state from the activated state in response to that the duration of continuous failure to monitor the wake-up signal reaches a threshold of a duration.

Optionally, the state determining sub-module is configured to enter a first sleep state or a second sleep state from the activated state based on a DRX cycle configured by the terminal, in response to that the number of times of continuous failure to monitor the wake-up signal reaches a first threshold of the number of times, or, enter the second sleep state from the activated state, in response to that the number of times of continuous failure to monitor the wake-up signal reaches a second threshold of the number of times, wherein, the first sleep state is a sleep state of a short DRX cycle, and the second sleep state is a sleep state of a long DRX cycle.

Optionally, the state determining sub-module is configured to enter a first sleep state or a second sleep state from the activated state based on a DRX cycle configured by the terminal, in response to that the number of times of continuous failure to monitor the wake-up signal within a set time reaches a first threshold of the number of times;

or, enter the second sleep state from the activated state, in response to that the number of times of continuous failure to monitor the wake-up signal within a set time reaches a second threshold of the number of times, wherein, the first sleep state is a sleep state of a short DRX cycle, and the second sleep state is a sleep state of a long DRX cycle.

Optionally, the state determining sub-module is configured to enter a first sleep state or a second sleep state from the activated state based on a DRX cycle configured by the terminal, in response to that the duration of continuous failure to monitor the wake-up signal reaches a first threshold of a duration;

or, enter the second sleep state from the activated state, in response to that the duration of continuous failure to monitor the wake-up signal reaches a second threshold of a duration, wherein, the first sleep state is a sleep state of a short DRX cycle, and the second sleep state is a sleep state of a long DRX cycle.

Optionally, the state determining sub-module is configured to: when the terminal is configured with a short DRX cycle, stop a running timer in an On Duration Timer and Inactivity Timer, enter the first sleep state and start a short cycle timer, and enter a long DRX cycle after the short cycle timer expires; or, when the terminal is not configured with a short DRX cycle, stop the running timer in the On Duration Timer and Inactivity Timer, and enter the second sleep state.

Optionally, the apparatus further includes:

a bandwidth part determining module, configured to determine a bandwidth part (BWP) currently used by the terminal;

a threshold determining module, configured to determine at least one of the threshold of the number of times or the threshold of the duration based on the currently used BWP.

Optionally, the terminal at least has two BWPs with different bandwidths, and the thresholds of the duration corresponding to the two BWPs with different bandwidths are the same or different, or, the thresholds of the number of times corresponding to the two BWPs with different bandwidths are the same or different.

Optionally, the apparatus further includes: a receiving module, configured to receive instruction information sent by an access network device, wherein the instruction information is used to instruct the terminal to enter a sleep state from the activated state based on the monitoring result of the wake-up signal.

According to a third aspect of the embodiments of the present disclosure, there is provided an apparatus for controlling a sleep state of a terminal, including: a processor; and a memory, for storing instructions executable by the processor, wherein the processor is configured to load and execute the executable instructions to implement the method for controlling the sleep state of a terminal according to the first aspect.

According to a fourth aspect of the embodiments of the present disclosure, there is provided a computer-readable storage medium, wherein instructions in the computer-readable storage medium enables to perform the method for controlling the sleep state of a terminal according to the first aspect when executed by a processor.

The technical solutions provided by the embodiments of the present disclosure may include following beneficial effects.

In the embodiment of the present disclosure, by monitoring the wake-up signal, and entering the sleep state from the activated state based on the monitoring result of the wake-up signal, the access network device does not need to additionally send the go-to-sleep signal to control the terminal to enter the sleep state from the activated state, which can save network signaling overhead.

It should be noted that the above general description and the following detailed description are merely exemplary and explanatory and should not be construed as limiting of the present disclosure.

BRIEF DESCRIPTION OF THE DRAWINGS

The drawings herein are incorporated into the specification and constitute a part of the specification, show embodiments in accordance with the present disclosure, and are used to explain the principle of the present disclosure together with the specification.

DETAILED DESCRIPTION

The exemplary embodiments will be described in detail here, and examples thereof are shown in the accompanying drawings. When the following description refers to the drawings, unless otherwise indicated, the same numbers in different drawings indicate the same or similar elements. The implementation manners described in the following exemplary embodiments do not represent all implementation manners consistent with the present disclosure. On the contrary, they are merely examples of apparatuses and methods consistent with some aspects of the present disclosure as detailed in the appended claims.

In order to facilitate the understanding of the embodiments of the present disclosure, some terms in the present disclosure are first explained below.

Figure 1:
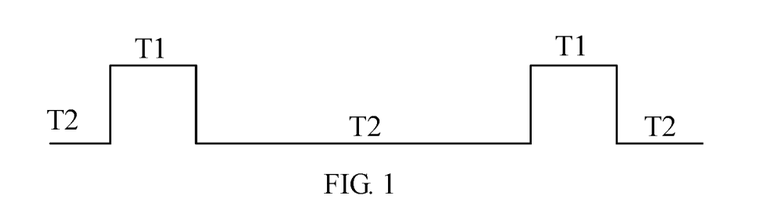
FIG. 1 is a schematic diagram of the DRX cycle.

DRX cycle: in the DRX mechanism, the network side configures the DRX cycle for the terminal in the Radio Resource Control (RRC) connection state. As shown in FIG. 1, the DRX cycle consists of the On Duration part T1 and "Opportunity for DRX" part T2. During the On Duration, the terminal monitors and receives the PDCCH, and during the Opportunity for DRX, the terminal may not monitor the PDCCH to reduce power consumption. The DRX cycle can be classified into a Short DRX Cycle or a Long DRX Cycle. The long DRX cycle is mandatorily configured by default, and the short DRX cycle is an optional configuration. If the terminal is configured with a short DRX cycle, the terminal will start a Short Cycle Timer when the short DRX cycle is used, and when the Short Cycle Timer expires, it will be converted to a long DRX cycle.

Wake Up Signal (WUS): a low-power detection signal, when the terminal receives the wake-up signal, it monitors the PDCCH when the On Duration arrives. If the terminal does not receive the WUS, it skips the On Duration and keeps the sleep state.

Go-to-Sleep Signal: it is used to instruct the terminal to go to sleep. It can be a DRX Command Media Access Control Control Unit (DRX Command MAC CE) or a long DRX Command MAC CE. When the terminal receives the go-to-sleep signal, it will stop the running timer in the On Duration Timer and the Inactivity Timer.

DRX Command MAC CE: when the terminal receives the DRX Command MAC CE, if the terminal is not configured with a short DRX cycle, it will directly use the long DRX cycle; if the terminal is configured with a short DRX cycle, it will use the short DRX cycle and start the Short Cycle Timer, and use the long DRX cycle after the Short Cycle Timer expires.

Long DRX Command MAC CE: when the terminal receives a long DRX Command MAC CE, it directly uses the long DRX cycle.

On Duration Timer: this parameter indicates that in a DRX cycle, the terminal monitors the time of PDCCH subframes, during this time, the terminal is in the wake-state.

Inactivity Timer: this parameter indicates after the terminal successfully decodes a PDCCH subframe, how many PDCCH subframes need to be monitored continuously.

Short Cycle Timer: this parameter indicates how many consecutive subframes in a short cycle do not decode the PDCCH successfully and enter a long cycle. For example, if the value of this parameter is 2, it means that the number of consecutive (2 multiplies short DRX cycle) subframes do not decode the PDCCH successfully and enter a long cycle.

Figure 2:
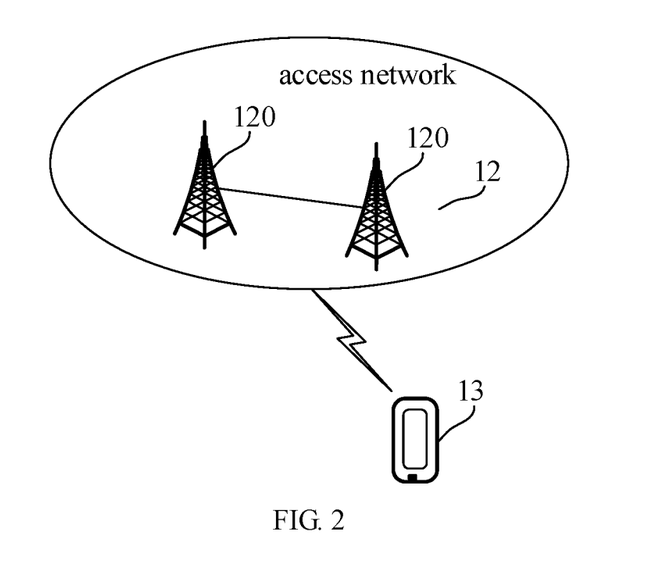
FIG. 2 is a schematic diagram showing the architecture of a communication system according to an exemplary embodiment.

FIG. 2 is a schematic diagram showing the architecture of a communication system according to an exemplary embodiment. As shown in FIG. 2, the communication system may include: an access network 12 and a terminal 13.

The access network 12 includes several access network devices 120. The access network device 120 may be a base station, and the base station is a device deployed in an access network to provide a wireless communication function for a terminal. The base station may include various forms of macro base stations, micro base stations, relay stations, access points, and so on. In systems using different wireless access technologies, the names of devices with base station functions may be different. For example, in LTE systems, they are called eNodeB or eNB; in 5G New Radio (NR) systems, they are called gNodeB or gNB. With the evolution of communication technology, the name "base station" may be described and will change. For the convenience of description, the above-mentioned devices that provide wireless communication functions for terminals are collectively referred to as access network devices hereinafter.

The terminal 13 may include various handheld devices, vehicle-mounted devices, wearable devices, computing devices with wireless communication functions or other processing devices connected to wireless modems, as well as various forms of user equipment (UE), mobile stations (MS), terminal devices, and so on. For ease of description, the devices mentioned above are collectively referred to as terminals. The access network device 120 and the terminal 13 communicate with each other through air interface technology, such as a Uu interface.

The terminal 13 is configured with a DRX cycle. During the DRX cycle, the terminal monitors and receives the PDCCH within the On Duration, and does not monitor the PDCCH within the Opportunity for DRX to reduce power consumption.

The communication system and business scenarios described in the embodiments of the present disclosure are intended to more clearly illustrate the technical solutions of the embodiments of the present disclosure, and do not constitute a limitation to the technical solutions provided by the embodiments of the present disclosure. Those of ordinary skill in the art will know that with the evolution of the communication system and the emergence of new business scenarios, the technical solutions provided in the embodiments of the present disclosure are equally applicable to similar technical problems.

Figure 3:
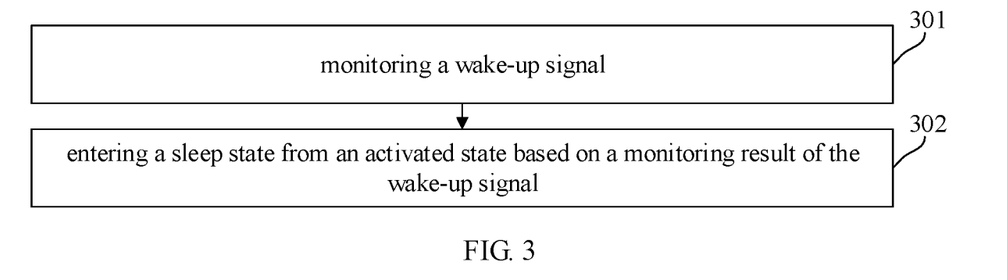
FIG. 3 is a flowchart showing a method for controlling a sleep state of a terminal according to an exemplary embodiment.

FIG. 3 is a flowchart showing a method for controlling a sleep state of a terminal according to an exemplary embodiment. The method may be executed by the terminal 13 in FIG. 2. Referring to FIG. 3, the method includes the following steps:

in step 301, monitoring a wake-up signal; and in step 302, entering a sleep state from an activated state based on a monitoring result of the wake-up signal.

In this step 301, the terminal can monitor the wake-up signal within a preset time. The preset time is a point in time.

For example, the preset time may be a time point before the start of the DRX cycle, for example, a time point with an offset from the start position of the On Duration time. Alternatively, the preset time may also be any time point within the activation time, and the activation time may be the On Duration time of the DRX cycle, or the running time of the Inactivity Timer, for example, the starting position of the On Duration time.

The wake-up signal is sent by the access network device 12 in FIG. 2. The preset time for the terminal to monitor the wake-up signal may be configured by the access network device 12. For example, the terminal may be notified through radio resource control signaling, media access control layer signaling, or physical layer signaling, or the preset time for the terminal to monitor the wake-up signal can also be defined according to predefined configuration parameters, for example, configured in the transmission protocol.

In this implementation manner, the preset time may be notified to the terminal through radio resource control signaling, media access control layer signaling, or physical layer signaling. Either existing signaling or new signaling may be used for transmission. For example, the media access control layer signaling may be a Control Element (CE) field in a Media Access Control (MAC) layer Protocol Data Unit (PDU).

It should be noted that in the process of monitoring the wake-up signal, the terminal may or may not receive the wake-up signal. The monitoring result in this step 302 can be used to indicate whether a wake-up signal is received.

For example, the activated state may be within the running time of the On Duration Timer or the running time of the Inactivity Timer.

In a possible implementation manner, entering a sleep state from an activated state based on a monitoring result of the wake-up signal includes:

determining reference information based on the monitoring result of the wake-up signal;

entering the sleep state from the activated state based on the reference information.

Optionally, the reference information includes at least one of: the number of times of continuous failure to monitor the wake-up signal, or a duration of continuous failure to monitor the wake-up signal. That is, the reference information may be the number of times of continuous failure to monitor the wake-up signal, or the reference information may be a duration of continuous failure to monitor the wake-up signal, or the reference information may include the number of times of continuous failure to monitor the wake-up signal and a duration of continuous failure to monitor the wake-up signal.

Optionally, entering the sleep state from the activated state based on the reference information includes: entering the sleep state from the activated state in response to that the reference information satisfies a trigger condition.

Optionally, the trigger condition includes at least one of: the number of times of continuous failure to monitor the wake-up signal reaching a threshold of the number of times, the number of times of continuous failure to monitor the wake-up signal within a set time reaching the threshold of the number of times, the duration of continuous failure to monitor the wake-up signal reaching a threshold of a duration.

Optionally, entering the sleep state from the activated state based on the reference information includes:

entering the sleep state from the activated state in response to that the number of times of continuous failure to monitor the wake-up signal reaches a threshold of the number of times;

or, entering the sleep state from the activated state in response to that the number of times of continuous failure to monitor the wake-up signal within a set time reaches a threshold of the number of times;

or, entering the sleep state from the activated state in response to that the duration of continuous failure to monitor the wake-up signal reaches a threshold of a duration.

In a possible implementation manner, entering the sleep state from the activated state in response to that the number of times of continuous failure to monitor the wake-up signal reaches a threshold of the number of times includes:

entering a first sleep state or a second sleep state from the activated state based on a Discontinuous Reception (DRX) cycle configured by the terminal, in response to that the number of times of continuous failure to monitor the wake-up signal reaches a first threshold of the number of times;

or, entering the second sleep state from the activated state, in response to that the number of times of continuous failure to monitor the wake-up signal reaches a second threshold of the number of times, wherein, the first sleep state is a sleep state of a short DRX cycle, and the second sleep state is a sleep state of a long DRX cycle.

The first threshold of the number of times and the second threshold of the number of times may be configured by the access network device according to actual conditions. For example, the first threshold of the number of times is smaller than or equal to the second threshold of the number of times.

In a possible implementation manner, entering the sleep state from the activated state in response to that the number of times of continuous failure to monitor the wake-up signal within a set time reaches a threshold of the number of times includes:

entering a first sleep state or a second sleep state from the activated state based on a DRX cycle configured by the terminal, in response to that the number of times of continuous failure to monitor the wake-up signal within a set time reaches a first threshold of the number of times;

or, entering the second sleep state from the activated state, in response to that the number of times of continuous failure to monitor the wake-up signal within a set time reaches a second threshold of the number of times, wherein, the first sleep state is a sleep state of a short DRX cycle, and the second sleep state is a sleep state of a long DRX cycle.

The first threshold of the number of times and the second threshold of the number of times may be configured by the access network device according to actual conditions. For example, the first threshold of the number of times is smaller than or equal to the second threshold of the number of times.

In a possible implementation manner, entering the sleep state from the activated state in response to that the duration of continuous failure to monitor the wake-up signal reaches a threshold of a duration includes:

entering a first sleep state or a second sleep state from the activated state based on a DRX cycle configured by the terminal, in response to that the duration of continuous failure to monitor the wake-up signal reaches a first threshold of a duration;

or, entering the second sleep state from the activated state, in response to that the duration of continuous failure to monitor the wake-up signal reaches a second threshold of a duration, wherein, the first sleep state is a sleep state of a short DRX cycle, and the second sleep state is a sleep state of a long DRX cycle.

The first threshold of the duration and the second threshold of the duration may be configured by the access network device according to actual conditions. For example, the first threshold of the duration is smaller than or equal to the second threshold of the duration.

Optionally, entering a first sleep state or a second sleep state from the activated state based on a DRX cycle configured by the terminal includes:

when the terminal is configured with a short DRX cycle, stopping a running timer in an On Duration Timer and Inactivity Timer, entering the first sleep state and starting a short cycle timer, and entering a long DRX cycle after the short cycle timer expires; or, when the terminal is not configured with a short DRX cycle, stopping the running timer in the On Duration Timer and Inactivity Timer, and entering the second sleep state.

In a possible implementation manner, the method further includes:

determining a bandwidth part (BWP) currently used by the terminal;

determining at least one of the threshold of the number of times or the threshold of the duration based on the currently used BWP.

In a possible implementation manner, the terminal at least has two BWPs with different bandwidths, and the thresholds of the duration corresponding to the two BWPs with different bandwidths are the same or different, or, the thresholds of the number of times corresponding to the two BWPs with different bandwidths are the same or different.

For example, the terminal has a first bandwidth part BWP and a second bandwidth part BWP. The bandwidth of the first bandwidth part BWP is smaller than the bandwidth of the second bandwidth part BWP, the threshold of the duration corresponding to the first bandwidth part BWP is greater than the threshold of the duration corresponding to the second bandwidth part BWP, and the threshold of the number of times corresponding to the first bandwidth part BWP is greater than the threshold of the number of times corresponding to the second bandwidth part BWP.

In a possible implementation manner, the method further includes:

receiving instruction information sent by an access network device, wherein the instruction information is used to instruct the terminal to enter a sleep state from the activated state based on the monitoring result of the wake-up signal.

In a possible implementation manner, the instruction information is carried in a broadcast message or dedicated signaling.

It is worth noting that the aforementioned steps 301-302 and the aforementioned optional steps can be combined arbitrarily.

Figure 4:
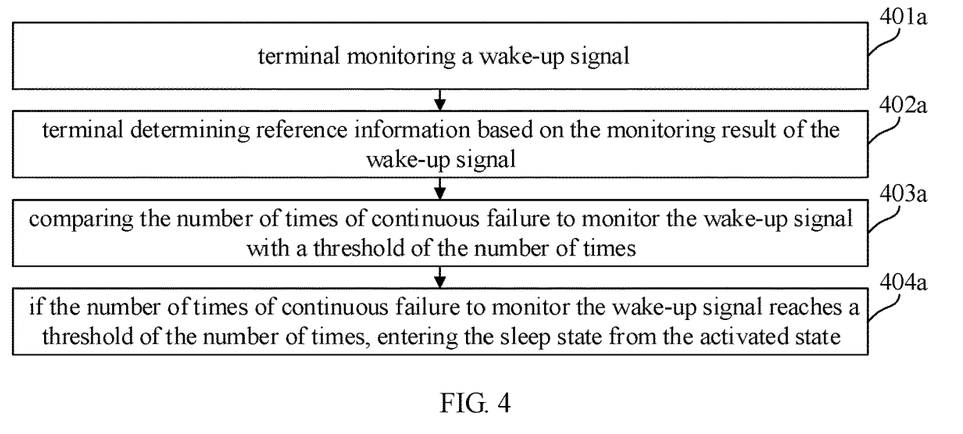
FIG. 4 is a flowchart showing a method for controlling a sleep state of a terminal according to an exemplary embodiment.

FIG. 4 is a flowchart showing a method for controlling a sleep state of a terminal according to an exemplary embodiment. Referring to FIG. 4, the method includes the following steps.

In step 401a, the terminal monitors the wake-up signal.

For the related description of this step 401a, please refer to step 301, which will not be described in detail here.

In step 402a, the terminal determines reference information based on the monitoring result of the wake-up signal.

In the process of monitoring the wake-up signal, the terminal may or may not receive the wake-up signal. The monitoring result in this step 402a can be used to indicate whether a wake-up signal is received.

For example, the monitoring result can be expressed in a numerical sequence, for example, in a binary sequence. In the binary sequence, 1 can indicate that the wake-up signal is received, and 0 indicates that the wake-up signal is not received. For another example, a counter may also be used to count the number of times of continuous failure to monitor the wake-up signal. When the wake-up signal is monitored, the counter is cleared, and when the wake-up signal is not monitored, the counter is incremented by one.

In this step 402a, the reference information includes the number of times of continuous failure to monitor the wake-up signal.

In step 403a, the number of times of continuous failure to monitor the wake-up signal is compared with the threshold of the number of times.

In step 404a, if the number of times of continuous failure to monitor the wake-up signal reaches the threshold of the number of times, the terminal enters the sleep state from the activated state.

In the embodiments of the present disclosure, the terminal enters the sleep state from the activated state based on the number of times of continuous failure to monitor the wake-up signal, the access network device does not need to additionally send the go-to-sleep signal to control the terminal to enter the sleep state from the activated state, which can save network signaling overhead. Moreover, this manner does not need to modify the existing signal, which has strong compatibility.

In a possible implementation manner, in this step 404a, the sleep state may be the sleep state in the short DRX cycle or the sleep state in the long DRX cycle, and entering the sleep state from the activated state includes: the terminal entering the sleep state in the short DRX cycle or entering the sleep state in the long DRX cycle based on the configured DRX cycle.

For example, the terminal entering the sleep state in the short DRX cycle or entering the sleep state in the long DRX cycle based on the configured DRX cycle may include: if the terminal is configured with the short DRX cycle, it enters the sleep state (i.e., the first sleep state) of the short DRX cycle and starts the Short Cycle Timer, and uses the long DRX cycle after the Short Cycle Timer expires; or, if the terminal is not configured with a short DRX cycle, it enters the sleep state (i.e., the second sleep state) of the long DRX cycle. That is to say, in this implementation manner, the terminal can perform the same process as the process performed after receiving the DRX Command MAC CE to replace the DRX Command MAC CE, to make the terminal enter the sleep state.

In a possible implementation manner, in this step 404a, the sleep state may be a sleep state in a long DRX cycle. That is, in this implementation manner, the terminal can perform the same process as the process performed after receiving the long DRX Command MAC CE to replace the long DRX Command MAC CE, to make the terminal enter the sleep state.

In another possible implementation manner, in this step 404a, the terminal enters a first sleep state or a second sleep state from the activated state based on a configured DRX cycle, in response to that the number of times of continuous failure to monitor the wake-up signal reaches a first threshold of the number of times; or, the terminal enters the second sleep state from the activated state, in response to that the number of times of continuous failure to monitor the wake-up signal reaches a second threshold of the number of times, wherein, the first threshold of the number of times is smaller than or equal to the second threshold of the number of times, the first sleep state is a sleep state of a short DRX cycle, and the second sleep state is a sleep state of a long DRX cycle.

For example, the threshold of the number of times is notified to the terminal by the base station access network device through broadcast or dedicated signaling. The threshold of the number of times may be a natural number, for example, 1, 2, etc., and the unit is number of times. The threshold value can be determined by the network side according to actual situations, for example, it can be determined by simulation.

It should be noted that if the threshold of the number of times includes the first threshold of the number of times and the second threshold of the number of times, in step 403a, the number of times of continuous failure to monitor the wake-up signal needs to be compared with the first threshold of the number of times and the second threshold of the number of times, respectively.

In this embodiment, the number of times of continuous failure to monitor the wake-up signal, the first threshold of the number of times and the second threshold of the number of times can be used to distinguish whether to perform the process the same as that performed after receiving the DRX Command MAC CE, or perform the process the same as that performed after receiving the long DRX Command MAC CE. Therefore, WUS can be used to replace both MAC CEs, which can further save network signaling overhead.

In the above three implementation manners, entering the sleep state from the activated state further includes: stopping a running timer in an On Duration Timer and Inactivity Timer. That is, if the On Duration Timer is running, the On Duration Timer is stopped; if the Inactivity Timer is running, the Inactivity Timer is stopped; if the On Duration Timer and the Inactivity Timer are running, the On Duration Timer and the Inactivity Timer are stopped.

Figure 5:
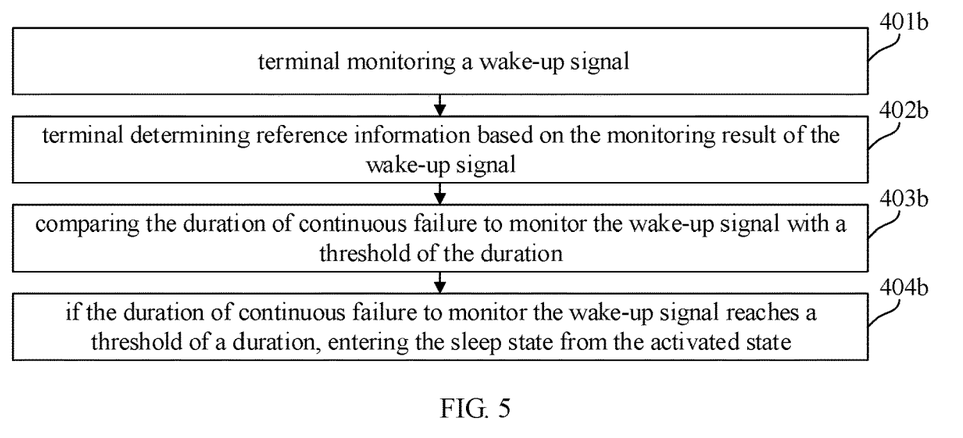
FIG. 5 is a flowchart showing a method for controlling a sleep state of a terminal according to an exemplary embodiment.

FIG. 5 is a flowchart showing a method for controlling a sleep state of a terminal according to an exemplary embodiment. Referring to FIG. 5, the method includes the following steps.

In step 401b, the terminal monitors the wake-up signal.

For the related description of this step 401b, please refer to step 301, which will not be described in detail here.

In step 402b, the terminal determines reference information based on the monitoring result of the wake-up signal.

In the process of monitoring the wake-up signal, the terminal may or may not receive the wake-up signal. The monitoring result in this step 402b can be used to indicate whether a wake-up signal is received.

In this step 402b, the reference information includes a duration of continuous failure to monitor the wake-up signal. For example, a timer can be used to record the duration of continuous failure to monitor the wake-up signal. When the wake-up signal is monitored, the timer is restarted, and the duration between the two restarts of the timer is the duration of continuous failure to monitor the wake-up signal.

In step 403b, the duration of continuous failure to monitor the wake-up signal is compared with the threshold of the duration.

In step 404b, if the duration of continuous failure to monitor the wake-up signal reaches the threshold of the duration, the terminal enters the sleep state from the activated state.

In the embodiments of the present disclosure, the terminal enters the sleep state from the activated state based on the duration of continuous failure to monitor the wake-up signal, the access network device does not need to additionally send the go-to-sleep signal to control the terminal to enter the sleep state from the activated state, which can save network signaling overhead. Moreover, this manner does not need to modify the existing signal, which has strong compatibility.

In a possible implementation manner, in this step 404b, the sleep state may be the sleep state in the short DRX cycle or the sleep state in the long DRX cycle, and entering the sleep state from the activated state includes: the terminal entering the sleep state in the short DRX cycle or entering the sleep state in the long DRX cycle based on the configured DRX cycle.

For example, the terminal entering the sleep state in the short DRX cycle or entering the sleep state in the long DRX cycle based on the configured DRX cycle may include: if the terminal is configured with the short DRX cycle, it enters the sleep state (i.e., the first sleep state) of the short DRX cycle and starts the Short Cycle Timer, and uses the long DRX cycle after the Short Cycle Timer expires; or, if the terminal is not configured with a short DRX cycle, it enters the sleep state (i.e., the second sleep state) of the long DRX cycle. That is to say, in this implementation manner, the terminal can perform the same process as the process performed after receiving the DRX Command MAC CE to replace the DRX Command MAC CE, to make the terminal enter the sleep state.

In a possible implementation manner, in this step 404b, the sleep state may be a sleep state in a long DRX cycle. That is, in this implementation manner, the terminal can perform the same process as the process performed after receiving the long DRX Command MAC CE to replace the long DRX Command MAC CE, to make the terminal enter the sleep state.

In another possible implementation manner, in this step 404b, the terminal enters a first sleep state or a second sleep state from the activated state based on a configured DRX cycle, in response to that the duration of continuous failure to monitor the wake-up signal reaches a first threshold of the duration; or, the terminal enters the second sleep state from the activated state, in response to that the duration of continuous failure to monitor the wake-up signal reaches a second threshold of the duration, wherein, the first threshold of the duration is smaller than or equal to the second threshold of the duration, the first sleep state is a sleep state of a short DRX cycle, and the second sleep state is a sleep state of a long DRX cycle.

For example, the threshold of the duration is notified to the terminal by the base station access network device through broadcast or dedicated signaling. The threshold of the duration may be a natural number, for example, 1, 2, etc., and the unit is millisecond. The threshold of the duration can be determined by the network side according to actual situations, for example, it can be determined by simulation.

It should be noted that if the threshold of the duration includes the first threshold of the duration and the second threshold of the duration, in step 403c, the duration of continuous failure to monitor the wake-up signal needs to be compared with the first threshold of the duration and the second threshold of the duration, respectively.

In this embodiment, the duration of continuous failure to monitor the wake-up signal, the first threshold of the duration and the second threshold of the duration can be used to distinguish whether to perform the process the same as that performed after receiving the DRX Command MAC CE, or perform the process the same as that performed after receiving the long DRX Command MAC CE. Therefore, WUS can be used to replace both MAC CEs, which can further save network signaling overhead.

In the above three implementation manners, entering the sleep state from the activated state further includes: stopping a running timer in an On Duration Timer and Inactivity Timer. That is, if the On Duration Timer is running, the On Duration Timer is stopped; if the Inactivity Timer is running, the Inactivity Timer is stopped; if the On Duration Timer and the Inactivity Timer are running, the On Duration Timer and the Inactivity Timer are stopped.

Figure 6:
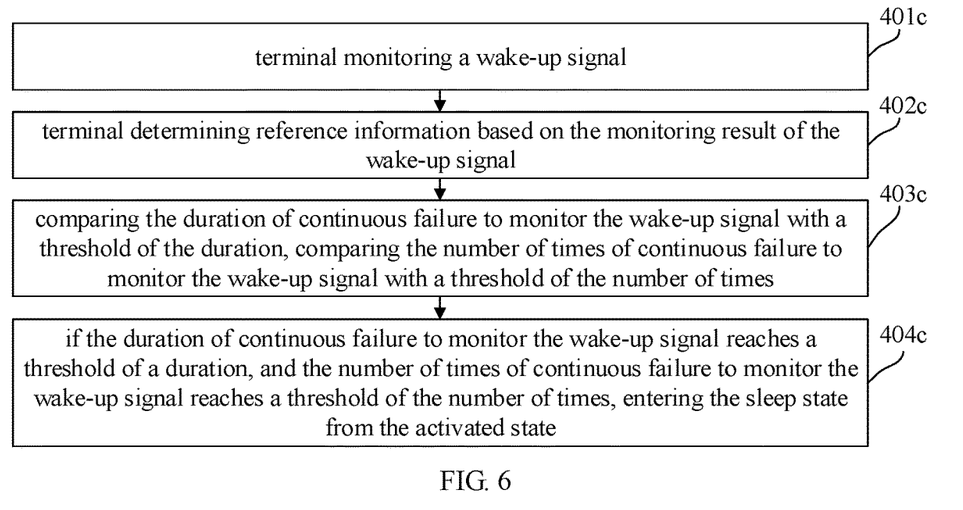
FIG. 6 is a flowchart showing a method for controlling a sleep state of a terminal according to an exemplary embodiment.

FIG. 6 is a flowchart showing a method for controlling a sleep state of a terminal according to an exemplary embodiment. Referring to FIG. 6, the method includes the following steps.

In step 401c, the terminal monitors the wake-up signal.

For the related description of this step 401c, please refer to step 301, which will not be described in detail here.

In step 402c, the terminal determines reference information based on the monitoring result of the wake-up signal.

In the process of monitoring the wake-up signal, the terminal may or may not receive the wake-up signal. The monitoring result in this step 402c can be used to indicate whether a wake-up signal is received.

In this step 402c, the reference information includes the number of times of continuous failure to monitor the wake-up signal and a duration of continuous failure to monitor the wake-up signal. The manner of determining the number of times and the duration may refer to the above steps 402a and 402b.

In step 403c, the duration of continuous failure to monitor the wake-up signal is compared with the threshold of the duration, and the number of times of continuous failure to monitor the wake-up signal is compared with the threshold of the number of times.

In step 404c, if the duration of continuous failure to monitor the wake-up signal reaches the threshold of the duration, and the number of times of continuous failure to monitor the wake-up signal reaches the threshold of the number of times, the terminal enters the sleep state from the activated state.

In the embodiments of the present disclosure, the terminal enters the sleep state from the activated state based on the duration of continuous failure to monitor the wake-up signal, the access network device does not need to additionally send the go-to-sleep signal to control the terminal to enter the sleep state from the activated state, which can save network signaling overhead. Moreover, this manner does not need to modify the existing signal, which has strong compatibility.

In a possible implementation manner, in this step 404c, the sleep state may be the sleep state in the short DRX cycle or the sleep state in the long DRX cycle, and the terminal enters the sleep state in the short DRX cycle or enters the sleep state in the long DRX cycle based on the configured DRX cycle.

For example, the terminal entering the sleep state in the short DRX cycle or entering the sleep state in the long DRX cycle based on the configured DRX cycle may include: if the terminal is configured with the short DRX cycle, it enters the sleep state (i.e., the first sleep state) of the short DRX cycle and starts the Short Cycle Timer, and uses the long DRX cycle after the Short Cycle Timer expires; or, if the terminal is not configured with a short DRX cycle, it enters the sleep state (i.e., the second sleep state) of the long DRX cycle. That is to say, in this implementation manner, the terminal can perform the same process as the process performed after receiving the DRX Command MAC CE to replace the DRX Command MAC CE, to make the terminal enter the sleep state.

In a possible implementation manner, in this step 404c, the sleep state may be a sleep state in a long DRX cycle. That is, in this implementation manner, the terminal can perform the same process as the process performed after receiving the long DRX Command MAC CE to replace the long DRX Command MAC CE, to make the terminal enter the sleep state.

In another possible implementation manner, in this step 404c, the terminal enters a first sleep state or a second sleep state from the activated state based on a configured DRX cycle, in response to that the duration of continuous failure to monitor the wake-up signal reaches a first threshold of the duration, and that the number of times of continuous failure to monitor the wake-up signal reaches a first threshold of the number of times; or, the terminal enters the second sleep state from the activated state, in response to that the duration of continuous failure to monitor the wake-up signal reaches a second threshold of the duration, and the number of times of continuous failure to monitor the wake-up signal reaches a second threshold of the number of times, wherein, the first threshold of the duration is smaller than or equal to the second threshold of the duration, the first threshold of the number of times is smaller than or equal to the second threshold of the number of times, the first sleep state is a sleep state of a short DRX cycle, and the second sleep state is a sleep state of a long DRX cycle.

For descriptions of the first threshold of the duration, the second threshold of the duration, the first threshold of the number of times, and the second threshold of the number of times, please refer to the foregoing steps 404a and 404b, and detailed descriptions are omitted herein.

In this embodiment, the duration and number of times of continuous failure to monitor the wake-up signal, the first threshold of the duration, the second threshold of the duration, the first threshold of the number of times and the second threshold of the number of times can be used to distinguish whether to perform the process the same as that performed after receiving the DRX Command MAC CE, or perform the process the same as that performed after receiving the long DRX Command MAC CE. Therefore, WUS can be used to replace both MAC CEs, which can further save network signaling overhead.

In the above three implementation manners, entering the sleep state from the activated state further includes: stopping a running timer in an On Duration Timer and Inactivity Timer. That is, if the On Duration Timer is running, the On Duration Timer is stopped; if the Inactivity Timer is running, the Inactivity Timer is stopped; if the On Duration Timer and the Inactivity Timer are running, the On Duration Timer and the Inactivity Timer are stopped.

Figure 7:
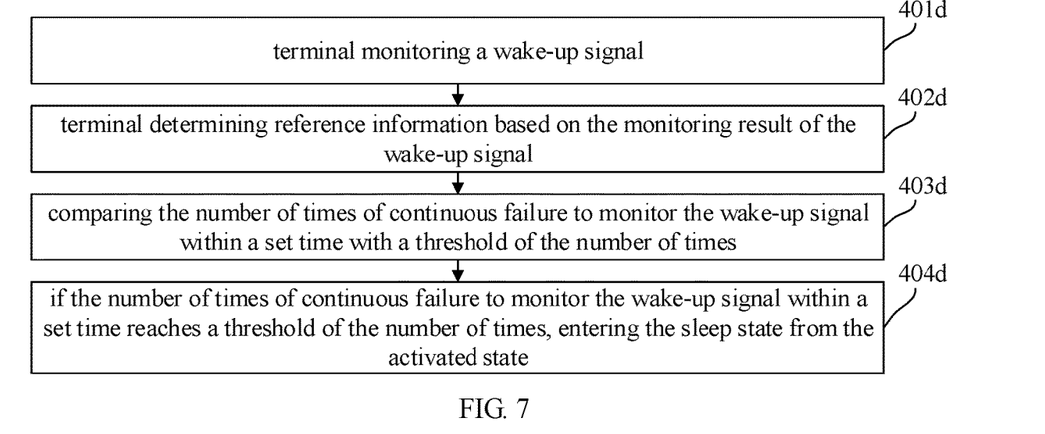
FIG. 7 is a flowchart showing a method for controlling a sleep state of a terminal according to an exemplary embodiment.

FIG. 7 is a flowchart showing a method for controlling a sleep state of a terminal according to an exemplary embodiment. Referring to FIG. 7, the method includes the following steps.

In step 401d, the terminal monitors the wake-up signal.

For the related description of this step 401d, please refer to step 301, which will not be described in detail here.

In step 402d, the terminal determines reference information based on the monitoring result of the wake-up signal.

In the process of monitoring the wake-up signal, the terminal may or may not receive the wake-up signal. The monitoring result in this step 402d can be used to indicate whether a wake-up signal is received.

For example, the monitoring result can be expressed in a numerical sequence, for example, in a binary sequence. In the binary sequence, 1 can indicate that the wake-up signal is received, and 0 indicates that the wake-up signal is not received. For another example, a counter may also be used to count the number of times of continuous failure to monitor the wake-up signal. When the wake-up signal is monitored, the counter is cleared, and when the wake-up signal is not monitored, the counter is incremented by one.

In this step 402d, the reference information includes the number of times of continuous failure to monitor the wake-up signal.

In step 403d, the number of times of continuous failure to monitor the wake-up signal within a set time is compared with the threshold of the number of times.

The set time is a time period. Illustratively, the starting point of the time period may be the moment when the wake-up signal was last monitored. The determination of the set duration can be achieved by using a timer. For example, if a wake-up signal is monitored, the timer is started or restarted to start timing. If the duration between the two starts reaches the set duration, the corresponding number of times of failure to monitor the wake-up signal is acquired, and the acquired number of times is compared with the threshold of the number of times.

In step 404d, if the number of times of continuous failure to monitor the wake-up signal within a set time reaches the threshold of the number of times, the terminal enters the sleep state from the activated state.

In the embodiments of the present disclosure, the terminal enters the sleep state from the activated state based on the number of times of continuous failure to monitor the wake-up signal, the access network device does not need to additionally send the go-to-sleep signal to control the terminal to enter the sleep state from the activated state, which can save network signaling overhead. Moreover, this manner does not need to modify the existing signal, which has strong compatibility.

In a possible implementation manner, in this step 404d, the sleep state may be the sleep state in the short DRX cycle or the sleep state in the long DRX cycle, and the terminal enters the sleep state in the short DRX cycle or enters the sleep state in the long DRX cycle based on the configured DRX cycle.

For example, the terminal entering the sleep state in the short DRX cycle or entering the sleep state in the long DRX cycle based on the configured DRX cycle may include: if the terminal is configured with the short DRX cycle, it enters the sleep state (i.e., the first sleep state) of the short DRX cycle and starts the Short Cycle Timer, and uses the long DRX cycle after the Short Cycle Timer expires; or, if the terminal is not configured with a short DRX cycle, it enters the sleep state (i.e., the second sleep state) of the long DRX cycle. That is to say, in this implementation manner, the terminal can perform the same process as the process performed after receiving the DRX Command MAC CE to replace the DRX Command MAC CE, to make the terminal enter the sleep state.

In a possible implementation manner, in this step 404d, the sleep state may be a sleep state in a long DRX cycle. That is, in this implementation manner, the terminal can perform the same process as the process performed after receiving the long DRX Command MAC CE to replace the long DRX Command MAC CE, to make the terminal enter the sleep state.

In another possible implementation manner, in this step 404d, the terminal enters a first sleep state or a second sleep state from the activated state based on a configured DRX cycle, in response to that the number of times of continuous failure to monitor the wake-up signal reaches a first threshold of the number of times; or, the terminal enters the second sleep state from the activated state, in response to that the number of times of continuous failure to monitor the wake-up signal reaches a second threshold of the number of times, wherein, the first threshold of the number of times is smaller than or equal to the second threshold of the number of times, the first sleep state is a sleep state of a short DRX cycle, and the second sleep state is a sleep state of a long DRX cycle.

For example, the set duration, the first threshold of the number of times, the second threshold of the number of times are notified to the terminal by the base station access network device through broadcast or dedicated signaling.

It should be noted that if the threshold of the number of times includes the first threshold of the number of times and the second threshold of the number of times, in step 403d, the number of times of continuous failure to monitor the wake-up signal needs to be compared with the first threshold of the number of times and the second threshold of the number of times, respectively.

In this embodiment, the set duration, the number of times of continuous failure to monitor the wake-up signal, the first threshold of the number of times and the second threshold of the number of times can be used to distinguish whether to perform the process the same as that performed after receiving the DRX Command MAC CE, or perform the process the same as that performed after receiving the long DRX Command MAC CE. Therefore, WUS can be used to replace both MAC CEs, which can further save network signaling overhead.

In the above three implementation manners, entering the sleep state from the activated state further includes: stopping a running timer in an On Duration Timer and Inactivity Timer. That is, if the On Duration Timer is running, the On Duration Timer is stopped; if the Inactivity Timer is running, the Inactivity Timer is stopped; if the On Duration Timer and the Inactivity Timer are running, the On Duration Timer and the Inactivity Timer are stopped.

In the embodiments shown in FIG. 4 to FIG. 7, the terminal may at least have two bandwidth parts (BWP) with different bandwidths, and the two BWPs with different bandwidths may correspond to different thresholds of the duration, or the two BWPs with different bandwidths may correspond to different thresholds of the number of times.

For example, the terminal has a first BWP and a second BWP, the bandwidth of the first BWP is smaller than the bandwidth of the second BWP, the threshold of the duration corresponding to the first BWP is greater than the threshold of the duration corresponding to the second BWP, and the threshold of the number of times corresponding to the first BWP is greater than the threshold of the number of times corresponding to the second BWP.

It should be noted that if the threshold of the number of times includes the first threshold of the number of times and the second threshold of the number of times, the first threshold of the number of times corresponding to the first BWP is greater than the first threshold of the number of times corresponding to the second BWP; the second threshold of the number of times corresponding to the first BWP is greater than the second threshold of the number of times corresponding to the second BWP. The threshold of the duration is similar to this.

Alternatively, the threshold may not be associated with the bandwidth of the BWP, but is configured by the access network device according to actual conditions. In this case, two BWPs with different bandwidths may also correspond to the same threshold (which may include the aforementioned threshold of the duration or the threshold of the number of times).

Optionally, the method shown in FIG. 4 to FIG. 7 may further include:

determining the BWP currently used by the terminal. The terminal can have at most one activated downlink BWP and one activated uplink BWP, that is, the currently used BWP, in one serving cell at the same time.

Based on the currently used BWP, at least one of the threshold of the number of times or the threshold of the duration is determined.

The correspondence between the BWP and the threshold (including the aforementioned threshold of the duration or the threshold of the number of times) may be pre-configured (for example, as stipulated in the protocol), or may also be notified to the terminal by the base station through a broadcast message or dedicated information.

By associating the bandwidth of the BWP with the threshold value, the determination of the threshold is more flexible. At the same time, since the BWP with a larger bandwidth consumes more power than the BWP with a smaller bandwidth, setting the threshold corresponding to the larger bandwidth BWP to be smaller than the threshold corresponding to the smaller bandwidth BWP can alleviate the more serious problem of power consumption of the terminal on the larger bandwidth BWP when it is activated.

Optionally, the method shown in FIG. 4 to FIG. 7 may further include:

receiving instruction information sent by an access network device, wherein the instruction information is used to instruct the terminal to enter a sleep state from the activated state based on the monitoring result of the wake-up signal.

Optionally, the instruction information is carried in a broadcast message or dedicated signaling.

Through this instruction information, it may realize that the access network device controls whether the terminal adopts a manner of controlling the terminal to enter the sleep state from the activated state based on the wake-up signal, and the application is more flexible.

Figure 8:
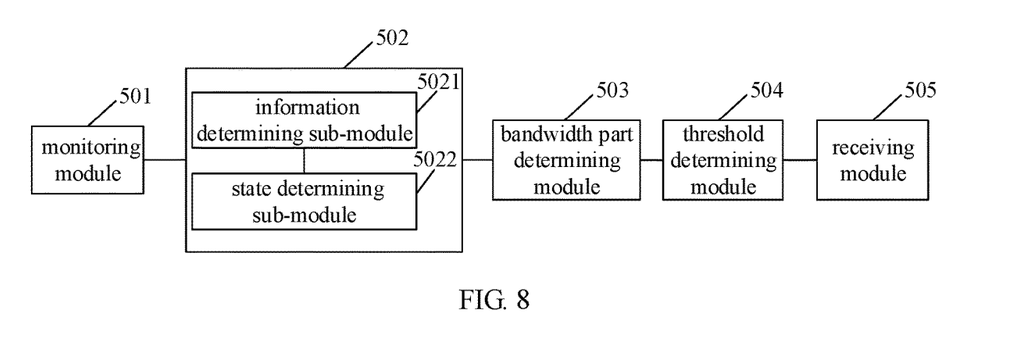
FIG. 8 is a schematic structural diagram showing an apparatus for controlling a sleep state of a terminal according to an exemplary embodiment.

FIG. 8 is a schematic structural diagram showing an apparatus for controlling a sleep state of a terminal according to an exemplary embodiment. The apparatus has the function of realizing the terminal in the above method embodiment, and the function can be realized by hardware, or by hardware executing corresponding software. As shown in FIG. 8, the apparatus includes: a monitoring module 501 and a sleep control module 502. The monitoring module 501 is configured to monitor a wake-up signal. The sleep control module 502 is configured to enter a sleep state from an activated state based on a monitoring result of the wake-up signal.

In a possible implementation manner, the sleep control module 502 includes: an information determining sub-module 5021, configured to determine reference information based on the monitoring result of the wake-up signal; a state determining sub-module 5022, configured to enter the sleep state from the activated state based on the reference information.

Optionally, the reference information includes at least one of: the number of times of continuous failure to monitor the wake-up signal, or a duration of continuous failure to monitor the wake-up signal.

Optionally, the state determining sub-module 5022 is configured to enter the sleep state from the activated state in response to that the reference information satisfies a trigger condition.

Optionally, the state determining sub-module 5022 is configured to enter the sleep state from the activated state in response to that the number of times of continuous failure to monitor the wake-up signal reaches a threshold of the number of times; or, the state determining sub-module 5022 is configured to enter the sleep state from the activated state in response to that the number of times of continuous failure to monitor the wake-up signal within a set time reaches a threshold of the number of times; or, the state determining sub-module 5022 is configured to enter the sleep state from the activated state in response to that the duration of continuous failure to monitor the wake-up signal reaches a threshold of a duration.

Optionally, the state determining sub-module 5022 is configured to enter a first sleep state or a second sleep state from the activated state based on a DRX cycle configured by the terminal, in response to that the number of times of continuous failure to monitor the wake-up signal reaches a first threshold of the number of times, or, enter the second sleep state from the activated state, in response to that the number of times of continuous failure to monitor the wake-up signal reaches a second threshold of the number of times, wherein, the first sleep state is a sleep state of a short DRX cycle, and the second sleep state is a sleep state of a long DRX cycle.

Optionally, the state determining sub-module 5022 is configured to enter a first sleep state or a second sleep state from the activated state based on a DRX cycle configured by the terminal, in response to that the number of times of continuous failure to monitor the wake-up signal within a set time reaches a first threshold of the number of times; or, enter the second sleep state from the activated state, in response to that the number of times of continuous failure to monitor the wake-up signal within a set time reaches a second threshold of the number of times, wherein, the first sleep state is a sleep state of a short DRX cycle, and the second sleep state is a sleep state of a long DRX cycle.

Optionally, the state determining sub-module 5022 is configured to enter a first sleep state or a second sleep state from the activated state based on a DRX cycle configured by the terminal, in response to that the duration of continuous failure to monitor the wake-up signal reaches a first threshold of a duration; or, enter the second sleep state from the activated state, in response to that the duration of continuous failure to monitor the wake-up signal reaches a second threshold of a duration, wherein, the first sleep state is a sleep state of a short DRX cycle, and the second sleep state is a sleep state of a long DRX cycle.

Optionally, the apparatus further includes:

a bandwidth part determining module 503, configured to determine a bandwidth part (BWP) currently used by the terminal;

a threshold determining module 504, configured to determine at least one of the threshold of the number of times or the threshold of the duration based on the currently used BWP.

Optionally, the apparatus further includes:

a receiving module 505, configured to receive instruction information sent by an access network device, wherein the instruction information is used to instruct the terminal to enter a sleep state from the activated state based on the monitoring result of the wake-up signal.

Optionally, the instruction information is carried in a broadcast message or dedicated signaling.

Figure 9:
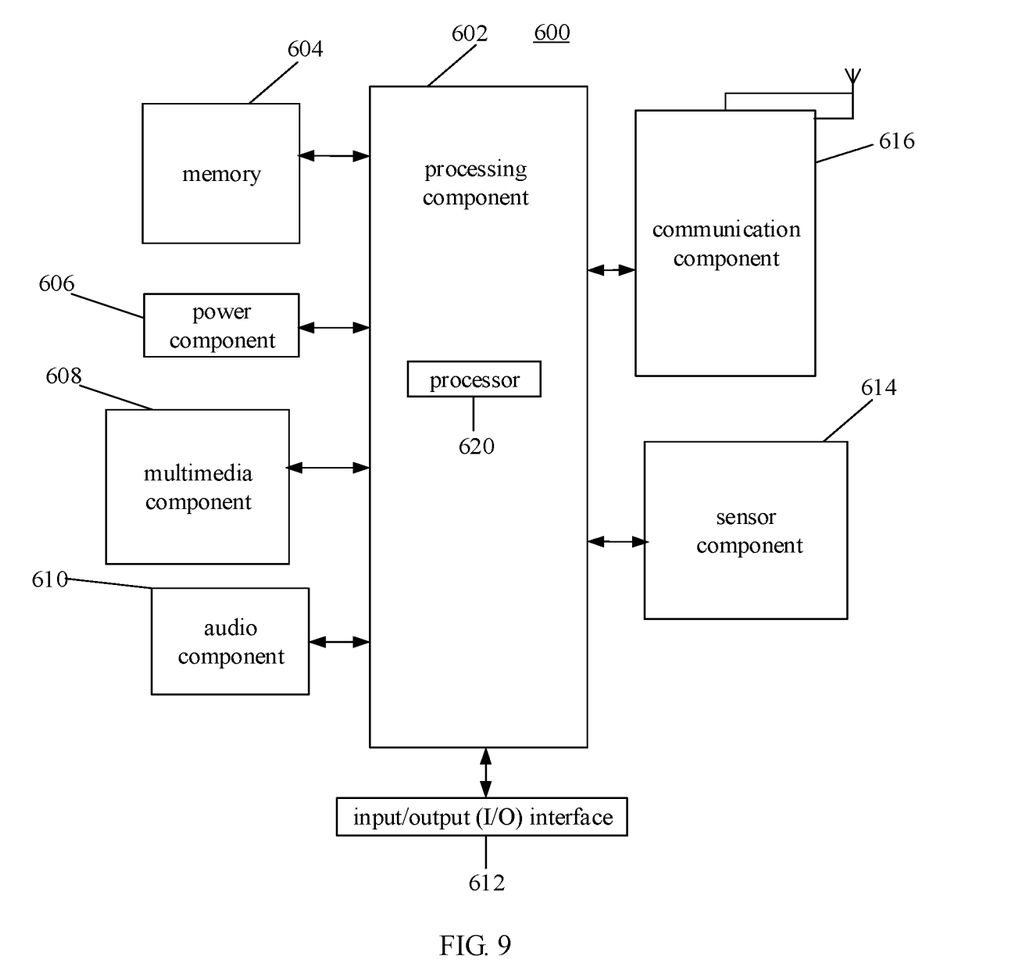
FIG. 9 is a schematic structural diagram showing an apparatus for controlling a sleep state of a terminal according to an exemplary embodiment.

FIG. 9 is a schematic structural diagram showing an apparatus 600 for controlling a sleep state of a terminal according to an exemplary embodiment. The apparatus 600 may be the above terminal. Referring to FIG. 9, the apparatus 600 for controlling a sleep state of a terminal may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the apparatus 600 for controlling a sleep state of a terminal, such as the operations associated with display, phone call, data communications, camera operations, and recording operations. The processing component 602 may include one or more processors 820 to execute instructions, to perform all or part of the steps of the above method. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the apparatus 600 for controlling a sleep state of a terminal. Examples of such data include instructions for any applications or methods operated on the apparatus 600 for controlling a sleep state of a terminal, contact data, telephone directory data, messages, pictures, video, or the like. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the apparatus 600 for controlling a sleep state of a terminal. The power component 606 may include a power management system, one or more power sources, and any other components associated with the generation, management, and distribution of power in the apparatus 600 for controlling a sleep state of a terminal.

The multimedia component 608 includes a screen providing an output interface between the apparatus 600 for controlling a sleep state of a terminal and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. When the apparatus 600 for controlling a sleep state of a terminal is in an operation mode, such as a shooting mode or a video mode, the front camera and/or the rear camera can receive external multimedia data. Each front and rear camera can be a fixed optical lens system or have focal length and optical zoom capability.

The audio component 610 is configured to output and/or input audio signals. For example, the audio component 610 includes a microphone ("MIC") configured to receive an external audio signal when the apparatus 600 for controlling a sleep state of a terminal is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. These buttons may include, but are not limited to, a home button, a volume button, a start button, and a lock button.

The sensor component 614 includes one or more sensors to provide status assessments of various aspects of the apparatus 600 for controlling a sleep state of a terminal. For instance, the sensor component 614 may detect an on/off status of the apparatus 600 for controlling a sleep state of a terminal, relative positioning of components, e.g., the display and the keypad, of the apparatus 600 for controlling a sleep state of a terminal, a change in position of the apparatus 600 for controlling a sleep state of a terminal or a component of the apparatus 600 for controlling a sleep state of a terminal, a presence or absence of user contact with the apparatus 600 for controlling a sleep state of a terminal, an orientation or an acceleration/deceleration of the apparatus 600 for controlling a sleep state of a terminal, and a change in temperature of the apparatus 600 for controlling a sleep state of a terminal. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate wireless communication between the apparatus 600 for controlling a sleep state of a terminal and other devices. In the embodiment of the present disclosure, the communication component 616 can access a wireless network based on a communication standard, such as 2G, 3G, 4G, or 5G, or a combination thereof, so as to realize random access. In an exemplary embodiment, the communication component 616 receives a broadcast signal or broadcast related information from an external broadcast management system via a broadcast channel. Optionally, the communication component 616 further includes an NFC module.

In exemplary embodiments, the apparatus 600 for controlling a sleep state of a terminal may be implemented with one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, to perform the above method for controlling a sleep state of a terminal.

In exemplary embodiments, there is also provided a non-transitory computer-readable storage medium including instructions, such as included in the memory 604, executable by the processor 620 of the apparatus 600 for controlling a sleep state of a terminal, for performing the method for controlling a sleep state of a terminal. For example, the non-transitory computer-readable storage medium may be a ROM, a RAM, a CD-ROM, a magnetic tape, a floppy disc, an optical data storage device, and the like.

Figure 10:
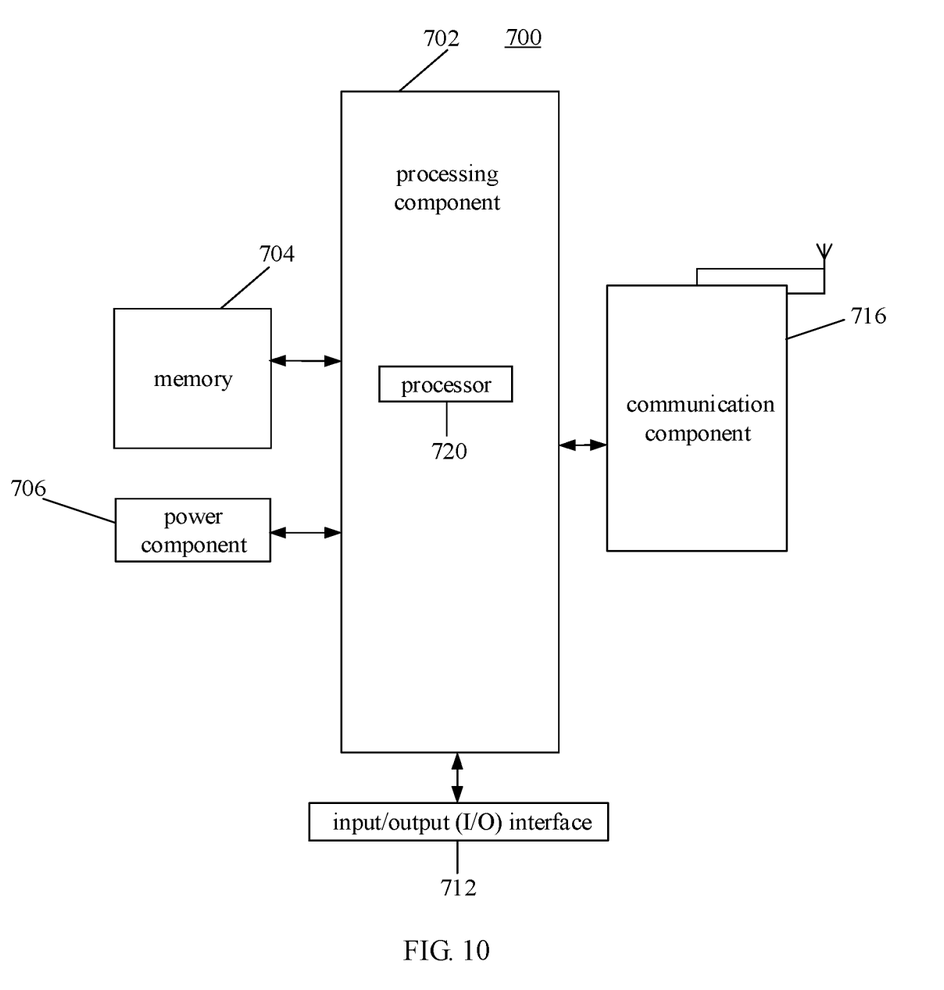
FIG. 10 is a block diagram showing an access network device according to an exemplary embodiment.

FIG. 10 is a block diagram showing an access network device 700 according to an exemplary embodiment. Referring to FIG. 10, the access network device 700 may include one or more of the following components: a processing component 702, a memory 704, a power component 706, an input/output (I/O) interface 712, and a communication component 716.

The processing component 702 generally controls overall operation of the access network device. The processing component 702 may include one or more processors 720 to execute instructions, to perform all or part of the steps of the above method. Moreover, the processing component 702 may include one or more modules which facilitate the interaction between the processing component 702 and other components.

The memory 704 is configured to store various types of data to support the operation of the access network device 700. Examples of such data include instructions for any applications or methods operated on the access network device 700. The memory 704 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the access network device 700. The power component 706 may include a power management system, one or more power sources, and any other components associated with the generation, management, and distribution of power in the access network device 700.

The I/O interface 712 provides an interface between the processing component 702 and peripheral interface modules, such as a keyboard, a click wheel, buttons, and the like. These buttons may include, but are not limited to, a home button, a volume button, a start button, and a lock button.

The communication component 716 is configured to facilitate wireless communication between the access network device and other devices. In the embodiment of the present disclosure, the communication component 716 can provide a wireless network based on a communication standard, such as 2G, 3G, 4G, or 5G, or a combination thereof, so as to be connected to the terminal device.

In exemplary embodiments, the access network device 700 may be implemented with one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components.

An exemplary embodiment of the present disclosure also provides a random-access system. The random-access system includes an access network device and a terminal. The terminal is for example, the apparatus for controlling a sleep state of a terminal provided by the embodiment as shown in FIG. 9. The access network device is as shown in FIG. 10, used to send a wake-up signal and the aforementioned broadcast message or dedicated signaling carrying indication information or various thresholds.

Other embodiments of the disclosure will be apparent to those skilled in the art from consideration of the specification and practice of the disclosure disclosed here. This application is intended to cover any variations, uses, or adaptations of the disclosure following the general principles thereof and including known knowledge or conventional technical means in the art not disclosed in the present disclosure. It is intended that the specification and embodiments are considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for controlling a sleep state of a terminal, comprising:
   monitoring for a wake-up signal; and
   entering a sleep state from an activated state based on a monitoring result of the wake-up signal,
   wherein the entering a sleep state from an activated state based on a monitoring result of the wake-up signal comprises:
   determining reference information based on the monitoring result of the wake-up signal, wherein the reference information comprises at least one of: the number of times of continuous failure to receive the wake-up signal, or a duration of continuous failure to receive the wake-up signal;
   entering the sleep state from the activated state based on the reference information.

2. The method according to claim 1, wherein the entering the sleep state from the activated state based on the reference information comprises:
   entering the sleep state from the activated state in response to that the reference information satisfies a trigger condition.

3. The method according to claim 2, wherein the trigger condition comprises at least one of: the number of times of continuous failure to receive the wake-up signal reaching a threshold of the number of times, the number of times of continuous failure to receive the wake-up signal within a set time reaching the threshold of the number of times, or the duration of continuous failure to receive the wake-up signal reaching a threshold of a duration.

4. The method according to claim 1, wherein the reference information comprises the number of times of continuous failure to receive the wake-up signal, and entering the sleep state from the activated state based on the reference information comprises:
   entering the sleep state from the activated state in response to that the number of times of continuous failure to receive the wake-up signal reaches a threshold of the number of times;
   or,
   the reference information comprises the number of times of continuous failure to receive the wake-up signal, and entering the sleep state from the activated state based on the reference information comprises:
   entering the sleep state from the activated state in response to that the number of times of continuous failure to receive the wake-up signal within a set time reaches a threshold of the number of times;
   or,
   the reference information comprises a duration of continuous failure to receive the wake-up signal, and entering the sleep state from the activated state based on the reference information comprises:
   entering the sleep state from the activated state in response to that the duration of continuous failure to receive the wake-up signal reaches a threshold of a duration.

5. The method according to claim 4, wherein the entering the sleep state from the activated state in response to that the number of times of continuous failure to receive the wake-up signal reaches a threshold of the number of times comprises:
   entering a first sleep state or a second sleep state from the activated state based on a Discontinuous Reception (DRX) cycle configured by the terminal, in response to that the number of times of continuous failure to receive the wake-up signal reaches a first threshold of the number of times;
   or,
   entering the second sleep state from the activated state, in response to that the number of times of continuous failure to receive the wake-up signal reaches a second threshold of the number of times,
   wherein, the first sleep state is a sleep state of a short DRX cycle, and the second sleep state is a sleep state of a long DRX cycle.

6. The method according to claim 5, wherein entering a first sleep state or a second sleep state from the activated state based on a DRX cycle configured by the terminal comprises:
   when the terminal is configured with a short DRX cycle, stopping a running timer in an On Duration Timer and Inactivity Timer, entering the first sleep state and starting a short cycle timer, and entering a long DRX cycle after the short cycle timer expires; or,
   when the terminal is not configured with a short DRX cycle, stopping the running timer in the On Duration Timer and Inactivity Timer, and entering the second sleep state.

7. The method according to claim 4, wherein entering the sleep state from the activated state in response to that the number of times of continuous failure to receive the wake-up signal within a set time reaches a threshold of the number of times comprises:
   entering a first sleep state or a second sleep state from the activated state based on a DRX cycle configured by the terminal, in response to that the number of times of continuous failure to receive the wake-up signal within a set time reaches a first threshold of the number of times;
   or,
   entering the second sleep state from the activated state, in response to that the number of times of continuous failure to receive the wake-up signal within a set time reaches a second threshold of the number of times,
   wherein, the first sleep state is a sleep state of a short DRX cycle, and the second sleep state is a sleep state of a long DRX cycle.

8. The method according to claim 4, wherein entering the sleep state from the activated state in response to that the duration of continuous failure to receive the wake-up signal reaches a threshold of a duration comprises:
   entering a first sleep state or a second sleep state from the activated state based on a DRX cycle configured by the terminal, in response to that the duration of continuous failure to receive the wake-up signal reaches a first threshold of a duration;
   or,
   entering the second sleep state from the activated state, in response to that the duration of continuous failure to receive the wake-up signal reaches a second threshold of a duration,
   wherein, the first sleep state is a sleep state of a short DRX cycle, and the second sleep state is a sleep state of a long DRX cycle.

9. The method according to claim 4, further comprising:
   determining a bandwidth part (BWP) currently used by the terminal;
   determining at least one of the threshold of the number of times or the threshold of the duration based on the currently used BWP.

10. The method according to claim 4, wherein the terminal at least has two BWPs with different bandwidths, and the thresholds of the duration corresponding to the two BWPs with different bandwidths are the same or different, or, the thresholds of the number of times corresponding to the two BWPs with different bandwidths are the same or different.

11. The method according to claim 1, further comprising:
   receiving instruction information sent by an access network device, wherein the instruction information is used to instruct the terminal to enter a sleep state from the activated state based on the monitoring result of the wake-up signal.

12. An apparatus for controlling a sleep state of a terminal, comprising:
   a processor; and
   memory storing instructions executable by the processor;
   wherein the processor is configured to:
   monitor for a wake-up signal; and
   enter a sleep state from an activated state based on a monitoring result of the wake-up signal,
   wherein the processor is further configured to:
   determine reference information based on the monitoring result of the wake-up signal, wherein the reference information comprises at least one of: the number of times of continuous failure to receive the wake-up signal, or a duration of continuous failure to receive the wake-up signal;
   enter the sleep state from the activated state based on the reference information.

13. The apparatus according to claim 12, wherein the processor is further configured to enter the sleep state from the activated state in response to that the reference information satisfies a trigger condition.

14. The apparatus according to claim 13, wherein the trigger condition comprises at least one of: the number of times of continuous failure to receive the wake-up signal reaching a threshold of the number of times, the number of times of continuous failure to receive the wake-up signal within a set time reaching the threshold of the number of times, or the duration of continuous failure to receive the wake-up signal reaching a threshold of a duration.

15. The apparatus according to claim 12, wherein the reference information comprises the number of times of continuous failure to receive the wake-up signal, and the processor is further configured to enter the sleep state from the activated state in response to that the number of times of continuous failure to receive the wake-up signal reaches a threshold of the number of times;
   or
   the reference information comprises the number of times of continuous failure to receive the wake-up signal, and the processor is further configured to enter the sleep state from the activated state in response to that the number of times of continuous failure to receive the wake-up signal within a set time reaches a threshold of the number of times;
   or,
   the reference information comprises a duration of continuous failure to receive the wake-up signal, and the processor is further configured to enter the sleep state from the activated state in response to that the duration of continuous failure to receive the wake-up signal reaches a threshold of a duration.

16. The apparatus according to claim 15, wherein the processor is further configured to enter a first sleep state or a second sleep state from the activated state based on a DRX cycle configured by the terminal, in response to that the number of times of continuous failure to receive the wake-up signal reaches a first threshold of the number of times,
   or,
   enter the second sleep state from the activated state, in response to that the number of times of continuous failure to receive the wake-up signal reaches a second threshold of the number of times,
   wherein, the first sleep state is a sleep state of a short DRX cycle, and the second sleep state is a sleep state of a long DRX cycle.

* * * * *